United States Patent [19]

Voss

[11] Patent Number: 4,763,240

[45] Date of Patent: Aug. 9, 1988

[54] POLYPHASE POWER ADAPTER FOR FREQUENCY REDUCTION

[75] Inventor: Earl Voss, Seymour, Ind.

[73] Assignee: Diversified Electronics, Inc., Evansville, Ind.

[21] Appl. No.: 82,105

[22] Filed: Aug. 6, 1987

[51] Int. Cl.[4] .......................................... H02M 5/257
[52] U.S. Cl. ..................................................... 363/161
[58] Field of Search ......................... 363/159, 160, 161

[56] References Cited

U.S. PATENT DOCUMENTS

| | | | |
|---|---|---|---|
| 3,487,289 | 12/1969 | McMurray | 363/161 |
| 3,585,489 | 6/1971 | Pelly et al. | 363/161 |
| 3,959,720 | 5/1976 | Bose et al. | 363/161 |
| 4,070,605 | 1/1978 | Hoeppner | 363/160 |
| 4,488,216 | 12/1984 | Gyugyi et al. | 363/160 |
| 4,572,961 | 2/1986 | Borger | 322/40 |
| 4,648,022 | 3/1987 | Schauder | 363/159 |
| 4,685,049 | 8/1987 | Neft | 363/159 |

*Primary Examiner*—Patrick R. Salce
*Assistant Examiner*—Anita M. Ault
*Attorney, Agent, or Firm*—Robert R. Keegan

[57] ABSTRACT

There is disclosed a polyphase power line adapter for providing polyphase electric power to operate a motor at a speed less than rated speed particularly useful for pump motors and the like where it is undesirable to stop the motor. A bridge of from nine to eighteen thyristors, which is also conventially used in cycloconverters, connects the input terminals to the output terminals. A delta-to-Y transformer arrangement and a wave shaping circuit produces cyclic pulse control signals synchronized with the wave-forms of the respective phases of the polyphase power line input; one such signal is transmitted to a divider circuit with a maximum division factor (always an integer) corresponding to the factor, N, by which the frequency, and hence, motor speed is to be reduced. A plurality of logical "and" circuits each has its inputs connected to receive one output from the divider circuit and cyclic pulse control signals are supplied to another of the inputs. The gates of the thyristors are supplied with the outputs of the logical "and" circuits and the entire arrangement causes only each Nth half-wave of one phase from the power line to be transmitted to a respective pair of output terminals and then to input terminals of a motor. Specific circuits for dividing the frequency by a factor of 2, or 3, and of 4 are illustrated; extension of the concept of other factors of division is explained.

20 Claims, 7 Drawing Sheets

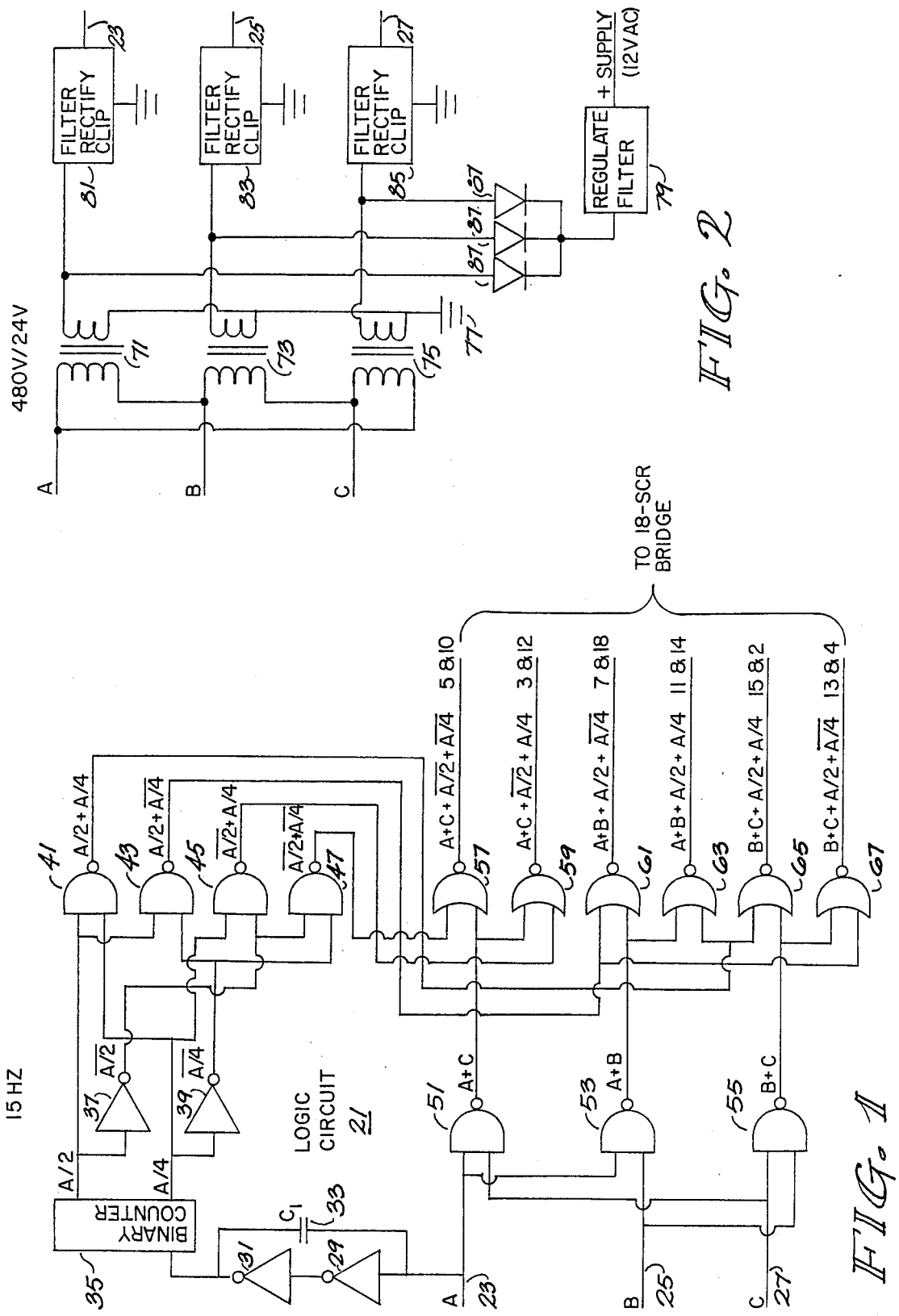

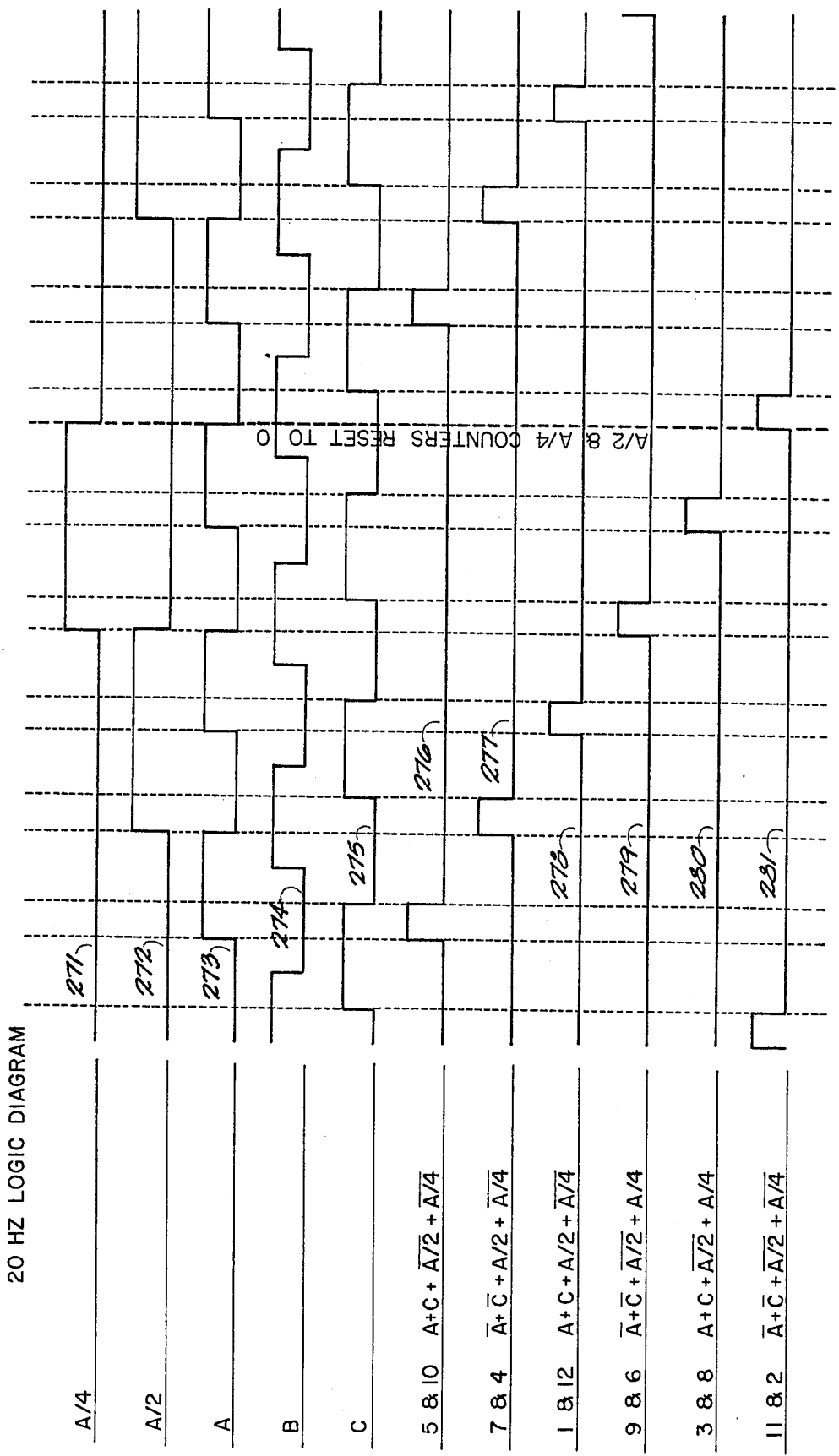

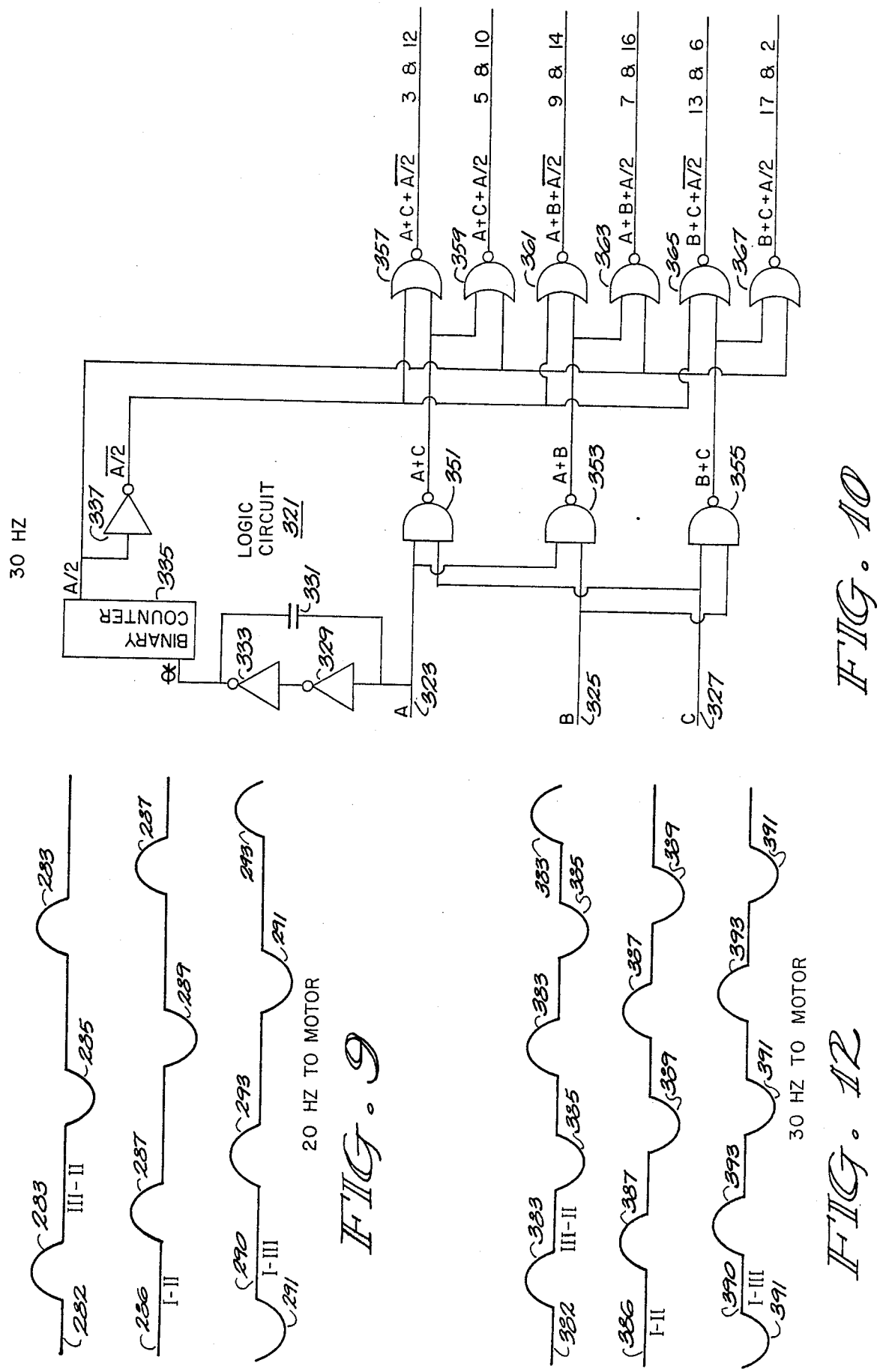

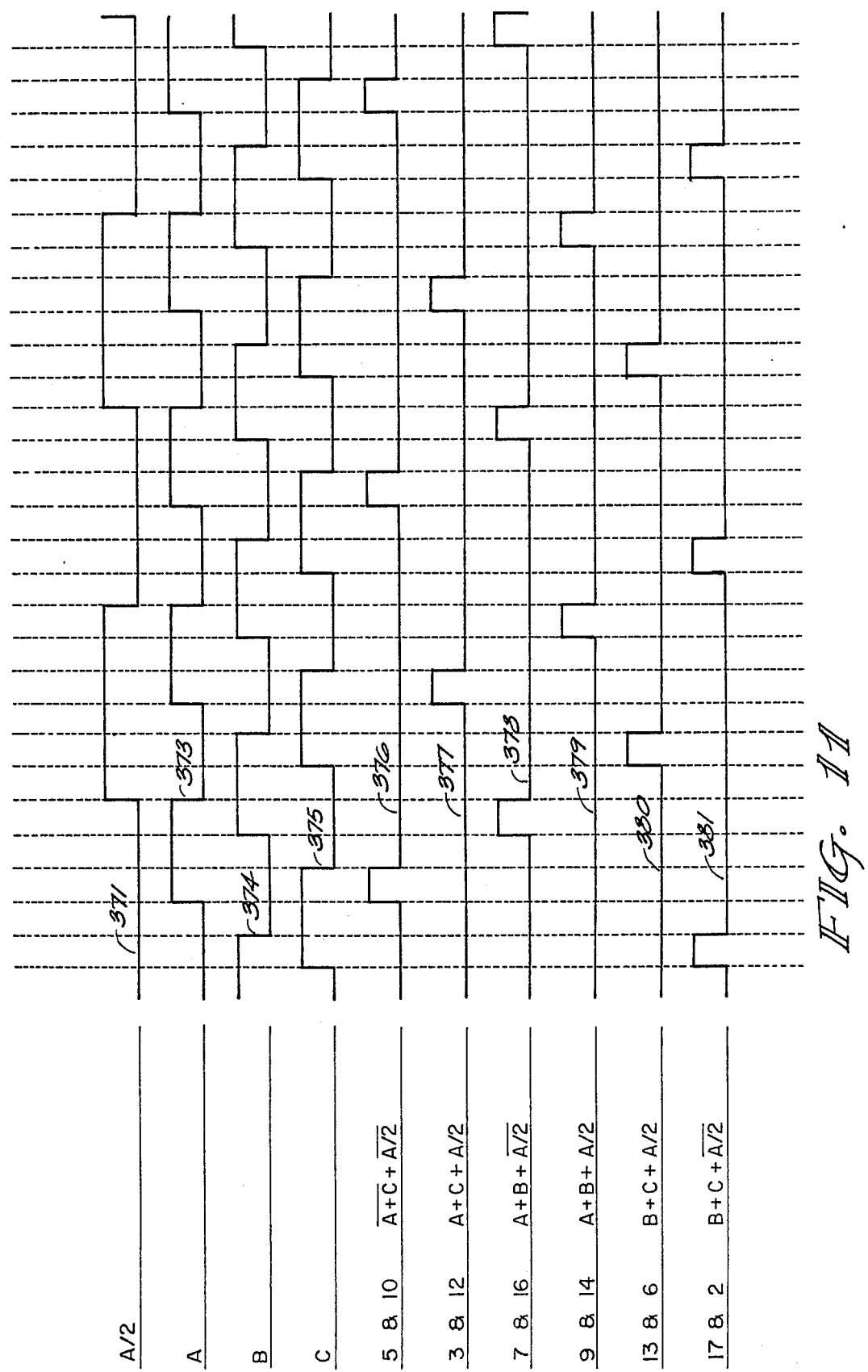

POLYPHASE POWER ADAPTER FOR FREQUENCY REDUCTION

The present invention relates to frequency conversion apparatus for polyphase power to be supplied to motors or the like. Many types of AC motors (other than universal motors) run at or near a constant speed which is determined by the frequency of the power suppled to the motor. In the United States the frequency is commonly 60 Hz. The speed of such motors is accordingly not easy to change or to control and much attention has been given to electronic means for doing so. One approach to changing the speed at which the motor runs is to change the frequency of the power supplied to the motor; power is supplied typically in a polyphase manner. There are also other reasons why one might wish to convert the frequency of a polyphase power supply, but they are relatively insignificant for the purposes of this discussion.

Among the devices for frequency conversion of polyphase power supplies is an apparatus known as a cycloconverter which typically permits changing the frequency by means of electronic switching to generate a range of wave-forms which approximate sinusoidal wave-forms of a frequency higher or lower than that of the input power. The present invention differs from the usual cycloconverter in that it has a more limited objective of producing just one lower frequency that differs from the input frequency by an integer factor. This objective is achieved with apparatus which is far simpler and more reliable than known cycloconverter circuitry.

Apparatus according to the present invention has in common with cycloconverter circuits the conventional thyristor bridge circuit usually consisting of from 9 to 18 semi-conductor electronic switching devices. These devices are connected in a network, referred to as a bridge, which permits any (or almost any) of the permutations by which an output terminal may be connected to an input terminal. One may note that each of three input terminals (using 3-phase power as an example) may be connected to any one of the output terminals giving 9 permutations. Then if the electronic switching elements are unidirectional, connection in each direction should be controlled giving a total of 18 electronic switching elements. This is an over-simplified explanation of thyristor bridge circuits for the purpose of describing applicant's invention and many variations are possible and are shown in prior publications.

In prior cycloconverter circuits attempts have been made to closely approximate a pure sinusoidal waveform at the desired output frequency which may be greater or less than the input frequency and may differ by an integer factor or by some different factor. In the apparatus of applicant's invention the objective is to greatly simplify the apparatus and accordingly, only frequencies of output less than the input are possible, and these are furthermore limited to output frequencies which are related to the input frequency by an integer factor. Furthermore, in applicant's invention there is no attempt to closely approximate a sinusoidal wave-form, but rather a wave-form is provided which has been empirically determined to efficiently operate a motor at reduced speed and hence at reduced load.

In some cases the apparatus of the invention when used as a motor speed reducer would include multi-pole switches so that it could be placed in operation or alternatively by-passed so the motors could be run with rated frequency and full power; such switches could be external or internal. Thus, in a chemical processing plant, for example, frequency adapter circuits according to the invention providing one-fourth frequency and one-fourth motor speed could be switched in and out on a time basis throughout a day, or some portion of a day, to vary the production of the chemical process from one-fourth of full production to full production. This would be applicable to other processes such as running oil pumps or water pumps where temporarily stopping the operation is undesirable.

The apparatus according to the invention operates electronically to switch half-wave pulses of the input power to appropriate output terminals leaving intervals where there is no electrical connection between a terminal of the input and a terminal of the output. The time of occurrence of these pulses in each of the phases of the output is such that the fundamental and dominant frequency in the output is one-half, one-third, one-fourth or other integer fraction relative to the frequency of the input. Since the output wave-form is not purely sinusoidal there are harmonic frequencies in the output, but these have been found to be relatively insignificant in the operation of motors or similar apparatus. Conventional filters may be employed to suppress the harmonics if desired.

Electronic circuitry required for the apparatus is remarkably simple, and thus inexpensive and reliable. There is no requirement for feedback from the output. Basically the gating signals for the thyristor bridge are produced by a generally conventional delta-to-Y converter, a single divider circuit and a plurality of logical "and" circuits, as will be explained in detail hereinafter.

There is a very extensive body of literature and patents relating to cycloconverters and other polyphase frequency converters. The majority of these references will show a thyristor bridge which is generally similar to that which may be employed in the apparatus of the present invention. U.S. Pat. No. 4,572,961 to William U. Borger, granted Feb. 25, 1986, U.S. Class 290/4 R, for example, shows an 18 thyristor (SCR) bridge which is substantially the same as employed in the present invention. The remainder of the Borger circuit is not similar to the present invention and its objective is different from the objective of the present invention. So far as it is known the arrangement of the present invention (and even the wave-form which it produces) is distinctly different from any proposed in prior art references. In U.S. Pat. No. 3,487,289 to William McMurray, granted Dec. 30, 1969, U.S. Class 321-45; there is a showing of power converter circuit wave-forms (FIG. 17 for example) which is the result of switching entire half-wave pulses, but it does not show that all half-wave pulses with the exception of the Nth pulse are being switched off leaving a substantial interval of no voltage between half-wave pulses in the output wave-form in each phase. Also the McMurray patent does not appear to disclose a polyphase-to-polyphase frequency converter or any switching control apparatus similar to that of the present invention. It should be noted that the present invention does not attempt to supply maximum power (i.e. maximum R.M.S. voltage) at the lower frequency. Rather, it intentionally switches off half-wave pulses to reduce the power output to be commensurate with the reduced speed at which the motor is intended to operate (given the same torque load). In this respect alone, it differs from most or all of the prior art patents, although the important distinction is the simplified electronic circuit apparatus.

In addition to providing the above described features and advantages it is an object of the present invention to provide a polyphase power adapter for frequency reduction by an integral factor which includes relatively few electronic components and in which the components are readily available off-the-shelf items, thereby producing a simple frequency converter usable for reducing motor speed or for other purposes.

It is another object of the present invention to provide a polyphase power adapter for frequency reduction wherein the switching sequence for thyristor elements in a thyristor bridge is controlled solely from the input polyphase power supply voltage thereby minimizing or eliminating any effects caused by changes in the load or other disturbances in the output circuit.

It is still another object of the present invention to provide a polyphase power adapter for frequency reduction wherein the output is not required to be filtered and the harmonic content is such that it is relatively innocuous in a power supply to an electric motor.

It is yet another object of the present invention to provide a polyphase power adapter for frequency reduction wherein there is no requirement for large, bulky, and expensive power transformers, inductors or the like.

Further objects and advantages of the invention will be apparent from consideration of the following description in conjunction with the appended drawings in which;

FIG. 1 is a schematic circuit diagram of a control logic circuit for generating gate signals to elements of a thyristor bridge to produce a 4-to-1 reduction in frequency;

FIG. 2 is a schematic circuit diagram of a delta-to-Y converter and power supply used to supply inputs to the circuit of FIG. 1;

FIG. 8 is a wave-form diagram helpful in explaining the operation of the circuit of FIG. 7;

FIG. 9 is a wave-form diagram of a representative voltage output of the apparatus according to the invention which employs the alternative circuit of FIG. 7;

FIG. 10 is a schematic diagram of an alternative circuit similar to that of FIG. 1 or FIG. 7 except that it is arranged to provide gating signals for a 2-to-1 frequency reduction;

FIG. 11 is a wave-form diagram helpful in explaining the operation of the circuit of FIG. 10; and FIG. 12 is a wave-form diagram of a representative voltage output of a circuit according to the invention employing the alternative circuitry of FIG. 10.

Figure 3:
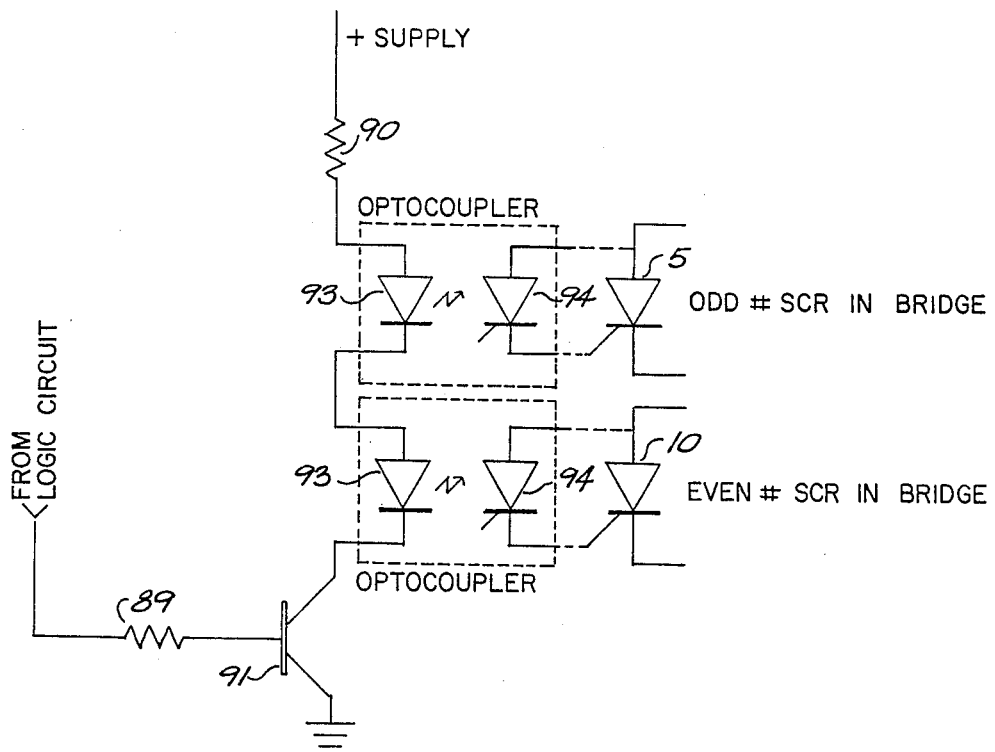
FIG. 3 is a schematic circuit diagram showing a coupler circuit for coupling the respective gates of two SCRs to one output from the circuit of FIG. 1.

Referring now to the drawings and particularly FIG. 1, a distintive logic circuit 21 is shown which receives timing signals on conductors 23, 25, and 27 derived from phase A, phase B, and phase C of the power line voltage (in a manner later to be described).

The A phase signal on conductor 23 is connected to the input of an inverter 29 which together with another inverter 31 in series therewith and a capacitor 33 in parallel with the two inverters causes leading edge enhancement of the A phase signal before it is transmitted to the input of binary counter 35. Binary counter 35 acts as a divider and has a divide by 2 output and a divide by 4 output labeled A/2 and A/4 respectively. These outputs respectively branch to inverters 37 and 39 whose output is accordingly "not" A/2 and "not" A/4 respectively.

The two basic and the two derived outputs from binary counter 35 are coupled to "nand" gates 41, 43, 45, and 47 in a known manner to produce outputs which are respectively 3, 2, 1, 0 modulo 4 of the running count of binary counter responding to A.

As noted the circuit of FIG. 1 is designed to provide a 4-to-1 frequency reduction with a resulting output of 15 Hz assuming a 60 Hz power supply. As is customary practice, "nand" gate integrated circuits are selected to implement this circuit for convenience, but the circuit could also be implemented with "and" gates which supply an output without a logical inversion. Throughout this discussion it will be understood that a "nand" gate is merely equivalent to a "and" gate plus an inverter. The term "and" gate will be deemed to include "nand" gates and also "and" gates without a built-in inversion function.

The outputs of "nand" gates 41, 43, 45, and 47 will be "on" only one at a time with each one being on for one out of four cycles of the A phase and repeating every fourth cycle of the A phase.

Six "nor" gates 57, 59, 61, 63, 65, and 67 have selected ones of the outputs of "nand" gates 41, 43, 45, and 47 connected to them as shown in FIG. 1. "Nand" gates 51, 53, and 55 have their inputs connected to conductors 23, 25, and 27 carrying signals phased with phase A, B, and C of the power supply. Each of the "and" circuits 51, 53, and 55 has two inputs and consequently the outputs of "and" circuits 51, 53, and 55 are on for 1/6 of the period of the power supply input cycle and are phased 120° apart to match phases A, B, and C of the input power supply. The output of "nand" circuit 51 is connected to input of "nor" circuits 57 and 59; the output of "nand" circuit 53 is connected to the input of "nor" circuits 61 and 63; and the output of "nand" circuit 55 is connected to the input of "nor" circuits 65 and 67.

The outputs of "nor" circuits 57, 59, 61, 63, 65, and 67 are connected to gates of a thyristor bridge through respective coupler circuits such as illustrated in FIG. 3.

It should be noted that while logic circuits 57, 59, 61, 63, 65, and 67 are "nor" circuits, they perform the function of "and" circuits because their inputs are inverted inputs from "nand" circuits 51, 53, 55 and "nand" circuits 41, 43, 45, and 47. As is well known in the digital electronics art this technique is utilized to employ a fewer number of standardized circuits and minimize the necessity for separate inverters. The labels on the outputs in FIG. 1 and similar figures are calculated to show the logic which is being implemented rather than actual polarity of the electrical signals. The electrical inversions which are not indicated cancel in the ultimate outputs so that the electronic output corresponds to the logic desired and indicated.

FIG. 2 shows the apparatus for converting a delta (3-terminal) three phase power supply voltage to provide Y configuration (4-terminal) low voltage signals to conductors 23, 25, and 27 of FIG. 1; a conventional DC power supply is also shown in FIG. 2. Specifically transformers 71, 73, and 75 have their primaries connected from A to B, from B to C, and from C to A respectively while their secondaries are connected in a Y network in which the fourth conductor 77 is connected to ground while the three legs of the Y are connected to respective filter rectifier, and clipper circuits 81, 83, and 85 of conventional form.

A conventional DC power supply comprises rectifier diodes 87 and regulator-filter circuit 79. DC power is supplied to the integrated circuits of the apparatus in a conventional manner which is not illustrated.

FIG. 3 shows the coupling circuit for coupling and buffering the outputs from a logic circuit to energize the gates of specific SCRs in the thyristor power bridge network. Six such optical couplers would be used in conjunction with the circuit of FIG. 1. Typically an output from the logic circuit of FIG. 1 would connect through resistor 89 to the base of transistor 91 which may have its emitter coupled to ground. An optocoupler unit consisting of one or more light emitting diodes 93 coupled respectively to photo transistors 94 is connected with diodes 93 in series with each other and with a resistor 90 between the collector of transistor 91 and the positive power supply so that when transistor 91 conducts, diodes 93 emit light to render photo transistors 94 conductive also. SCRs 5 and 10 (for example) are thus rendered conductive for anode-to-cathode current when a low voltage output from the logic circuit renders transistor 91 conductive. Current continues through the SCRs until anode-to-cathode voltage drops to zero. The optical coupler circuits as illustrated in FIG. 3 serve to keep the conductors to the gates of SCRs (5 and 10 for example) isolated while at the same time rendering these SCRs conductive in unison. This is a conventional technique and other conventional techniques for accomplishing this purpose could equally well be used.

Figure 4:
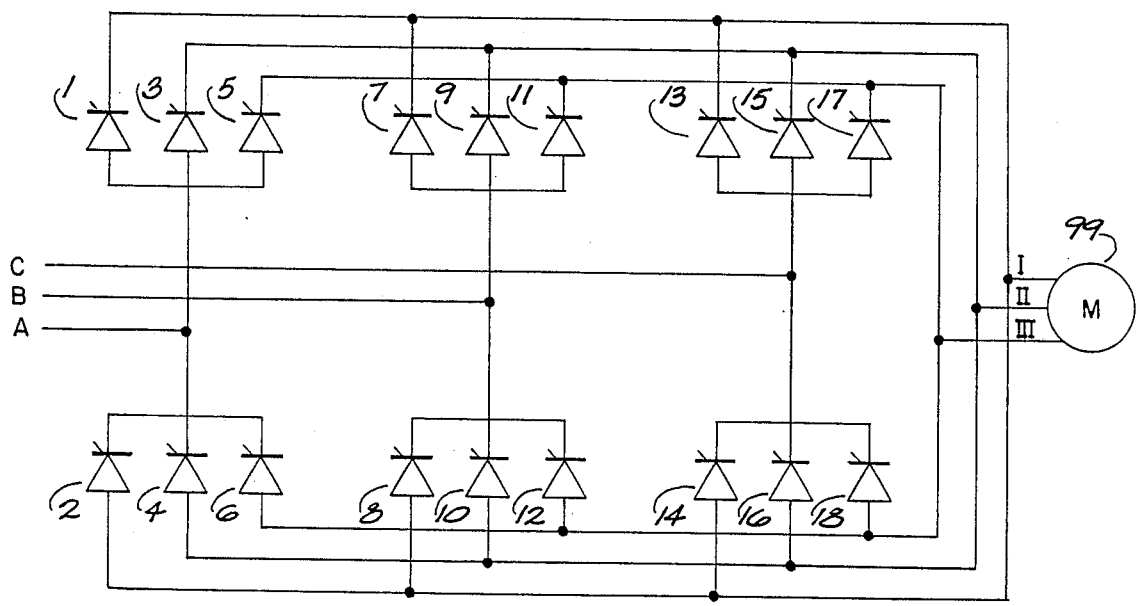
FIG. 4 is a schematic circuit diagram of a conventional SCR (thyristor) bridge circuit and motor load connected thereto.

FIG. 4 shows a conventional thyristor bridge including 18 SCRs numbered 1 through 18 and a motor 99 with its three phases connected respectively to conductors I, II and III. As will be seen in the explanation of operation, three phase power applied at A, B, C is switched by SCRs 1 through 18 to provide pulses at terminals I, II and III with a lower repetition rate (by a factor of 4 in this case) to drive motor 99 at less than its rated speed.

The SCRs in FIG. 4 are connected in pairs by means of optical couplers as shown in FIG. 3 in a sequence determined by the logic circuit of FIG. 1 (or one of the alternative logic circuits). In the alternative logic circuit embodiments later to be described, it will be noted that a different logic circuit (FIG. 7 or FIG. 10) is substituted for the logic circuit of FIG. 1, but the apparatus of FIGS. 2, 3, and 4 is substantially the same in the alternative embodiment.

It will be obvious to those skilled in the art that the invention is not limited to three phase power distribution which has been used for illustration, and straightforward modifications known to those skilled in the art would suffice to modify the system to operate with four-phase power, for example.

Figure 5:
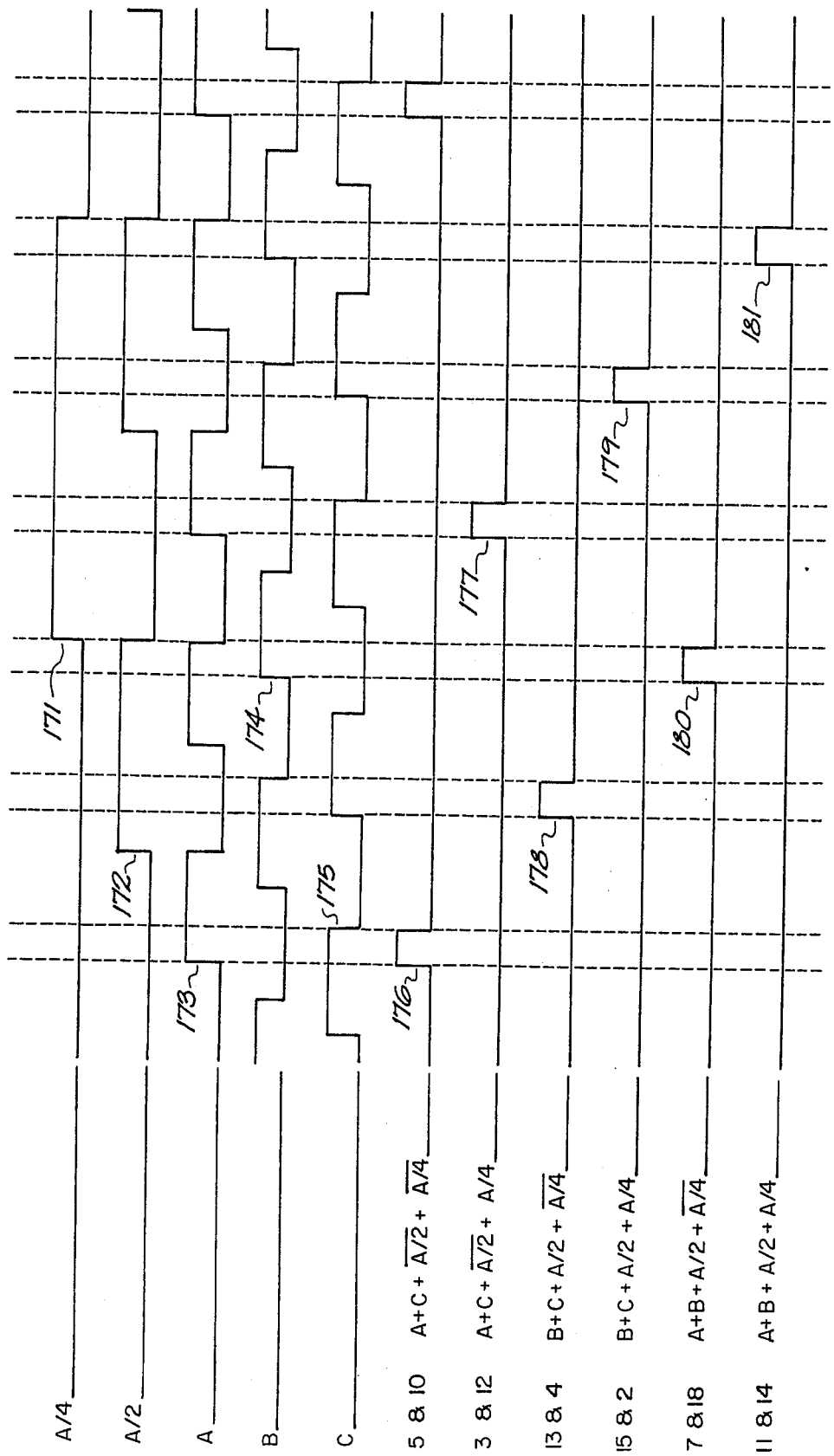
FIG. 5 is a wave-form diagram helpful in explaining the manner in which the circuit of FIG. 1 produces output gate signals.
Figure 6:
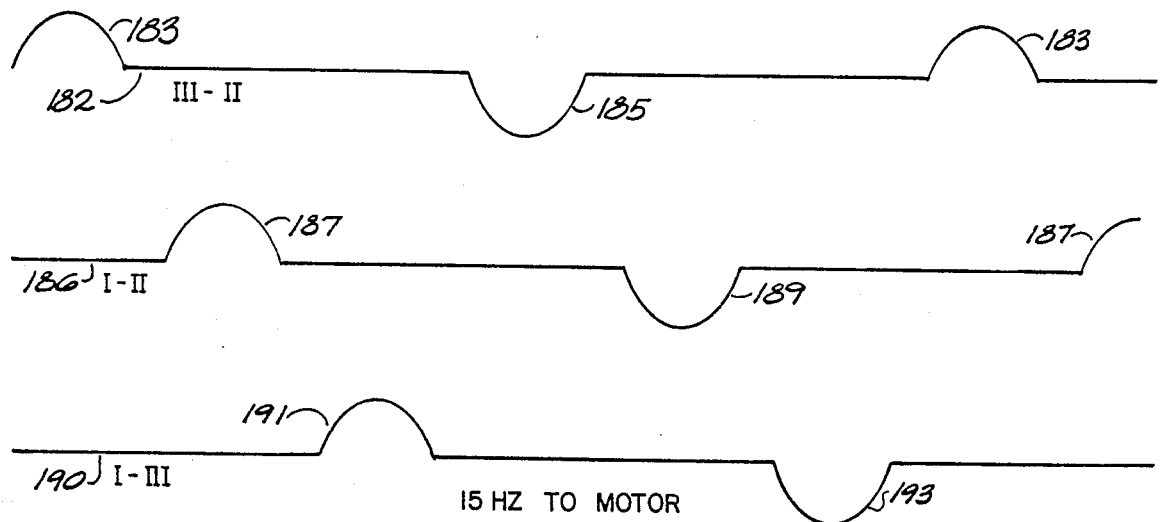
FIG. 6 is a wave-form diagram showing a representative wave-form of the voltage produced at the output of the circuit shown in FIGS. 1 through 4.

Operation of the embodiment of the invention shown in FIGS. 1 through 4 will best be understood by reference to FIG. 1 in conjunction with the wave-form diagrams of FIGS. 5 and 6. As shown by the wave-forms labelled A, B, and C in FIG. 5 at 173, 174, and 175 respectively, the signals from the delta-to-Y transforming arrangement of FIG. 2 on conductors 23, 25, and 27 each have a square-wave pulse with a 50% duty cycle that occurs once for each cycle of the power supply frequency. The wave-forms 173, 174, and 175 are similar except that they are phased 120° apart corresponding to the phase relation of the three phases of the power input.

A few words are now in order concerning the notation in FIGS. 1 and 5. Considering "nand" circuit 51, for example, its output is labelled A+C while its inputs are from conductors 23 and 27 which are labelled A and C respectively. For the purpose of logic analysis the output of "nand" circuit 51 is considered to be equal to the result of a logical "and" operation on the instantaneous values of the wave-forms at conductors 23 labelled A and 27 labelled C. To simplify the explanation we are ignoring the fact that the output of "nand" circuit 51 (as well as circuits 53 and 55) is inverted. Ignoring these inversions does not effect the logical analysis because all ignored inversions cancel out in the end result.

The wave-forms of the outputs of "nand" circuits 51, 53, and 55 are not shown is FIG. 5, but can readily be deduced by looking at wave-form A and wave-form C for example, where it will be seen that wave-form A and wave-form B are both "on" at the same time for only 1/6 of the cycle of the input power (period of the wave-form A).

Consider now the binary counter 35 which is fed from the wave-form A at conductor 23. Inverting amplifiers 29 and 31 and capacitor 33 are merely wave-shaping elements not affecting the logic computation. The outputs of the binary counter 35 are labelled A/2 and A/4 and their wave-forms are shown at the top of FIG. 5. The wave-form A/2 is a square wave with twice the period, or half the frequency, of the wave-form A. That is, A/2 is off for the first full cycle of wave-form A and on for the second full cycle of A, and so on.

Wave-form A/4 representing the other output from binary counter 35 is to A/2 as A/2 is to A. Thus, wave-form A/4 has a period four times as long as the period of A, or put another way, a frequency only ¼ as great.

Inverters 37 and 39 produce wave-forms which are the inverse of A/2 and A/4 and are shown as A/2 and A/4. The two direct outputs and the two derived outputs from binary counter 35 are supplied to the input 30 of four "nand" circuits 41, 43, 45, and 47 in a known manner to produce four square wave-forms with a duty cycle of 25% and a period four times that of wave-form A. Thus, during each sequence of four cycles of the input power supply one and only one of the outputs of "nand" circuits 41, 43, 45, and 47 is on for any given cycle.

As previously noted the logic circuit 21 of FIG. 1 is designed to produce an output from the adapter of a frequency of 15 Hz which is, of course, a factor of four reduction of the input power frequency, assumed to be 60 Hz. The adapters according to the invention would also serve with 50 Hz, 400 Hz or other power frequencies. The four outputs from "nand" circuits 41, 43, 45, and 47 are thus utilized to select every fourth half-wave from the input of the adapter to go to the output of the adapter while the outputs of "nand" circuits 51, 53, and 55 synchronized with the phases of the input direct the half-wave from a particular phase of the input to a desired phase of the output with the correct polarity. The particular pair of SCRs of FIG. 4 to be rendered conductive by a gate signal to accomplish the transmission of such a half-wave pulse is selected by the configuration of four "nor" circuits 57, 59, 61, 63, 65, and 67.

The "nand" circuits 41, 43, 45, 47, 51, 53, and 55 together with the "nor" circuits 57, 59, 61, 63, 65, and 67 may each be considered to be performing a logical "and" function on two input wave-forms to produce an output wave-form. Accordingly, the outputs of "nor" circuits 57, 59, 61, 63, 65, and 67 have the result of successive logical "and" operations to produce a wave-form representing the logical summations indicated in FIG. 5. For example, the output of "nor" circuit 57 corresponds to the logical operation A "and" C "and" not A/2 "and" not A/4. By referring to FIG. 5 it will be seen that wave-form 176 labelled 5 & 10 corresponds to the output of "nor" circuit 57 and has a square pulse representing the on time of "nand" circuit 57. By reference to FIG. 5, and particularly the pulse bordered by the left most pair of vertical dashed lines in wave-form 176, it can be confirmed that indeed the situation prevailing at this time is, A is on, B is off, C is on, A/2 is off, A/4 is off. As expected, this condition does not recur until four full cycles of the input power (and of wave-form A) have elapsed.

Examination of the states of wave-forms 171–175 in like manner for pulses of wave-forms 177, 178, 179, 180, and 181 will show the manner of generation of all pulses from "nor" circuit 57, 59, 61, 63, 65, and 67 which are supplied to control the gates of the SCRs 1 through 18. It should be noted that for this embodiment certain of the 18 SCRs are never gated on and could be omitted. For the embodiment of FIG. 1 the unused SCRs are 1, 6, 8, 9, 16, and 17. Embodiments later described will utilize these SCRs while some utilized in the FIG. 1 embodiment will be unused. In general the embodiments illustrated each use 12 of the 18 SCRs, and in one or the other of the three embodiments all SCRs are used.

It is next useful to compare the wave-forms 176–181 of FIG. 5 with the wave-forms of FIG. 6. Wave-forms 182, 186, and 190 of FIG. 6 represent respectively the input to the three phases of motor 99 in FIG. 4 which have been designated III-II, I-II, and I-III. Note that the positive going wave-form 183 of wave-form 182 is generated by wave-form 176 in FIG. 5 while the negative going half-wave 185 in FIG. 6 is produced by the wave-form 177 of FIG. 5. In a similar fashion wave-form 186 of FIG. 6 has positive going wave-forms 187 due to wave-form 178 of FIG. 5 and negative going wave-form 189 produced by wave-form 179 of FIG. 5. Then wave-form 190 has positive half-wave 191 corresponding to wave-form 180 of FIG. 5 and negative half-wave 193 corresponding to wave-form 181 of FIG. 5.

It will be seen that the apparatus of FIG. 1 produces the desired logic operations to generate the output wave-form from the adapter as shown in FIG. 6 wherein every fourth half-wave of a phase of the input is properly connected to a phase of the output to provide an output wave-form with a dominant frequency component at ¼ the frequency of the input power.

It should be mentioned that the wave-forms in FIG. 6 are not intended to and do not represent the current in the windings of a motor such as motor 79. Particularly if such a motor is delta wound, voltage applied to the III and II terminals (for example) will produce current in the winding connected therebetween, but will also produce lesser opposite current in the other two windings. No attempt is shown in FIG. 6 or elsewhere to represent the current which would be generated in a motor connected to the output of an adapter according to the present invention. The nature of the motor or the other load would affect the current flow and thus, no generalized representation would be perfectly valid. However, it has been empirically determined that conventional three phase motors of various types will accept such wave-forms and operate efficiently with voltage wave-forms corresponding to those shown in FIG. 6 (and later figures for other embodiments).

It is important to mention that the particular relationship of the logic circuit 21 with the specific ones of SCRs 1 through 18 is not the only arrangement which may be used to carry out the invention. Of course, the SCRs could be renumbered so that phase I, II, and III were rotated or otherwise interchanged. Also the direction of the rotation of motor 99 may be reversed by rearranging the phase connections thereto. In addition to these apparent modifications in the connection of the SCRs another modification should be noted. As seen in FIG. 1 each of the "nand" circuits 57, 59, 61, 63, 65, and 67 is connected to gate two and only two SCRs. Furthermore, only one of such "nand" circuits is operative at any given time so that the current path defined by the gated SCRs is unidirectional. Of course, the direction of the path conforms to the positive to negative voltage difference then prevailing at the terminals. In some cases it may be desirable to have this path a bi-directional path that would allow current to flow back from the motor into the power line. One does not normally think of the motor generating a current which flows back into the power line, but this may occur when the back emf of the motor due to the motor speed is greater than the applied voltage from the power line. The possibility of current flowing back into the power line when the motor speed is abnormally high has a braking effect on the motor and tends to prevent the motor from overspeeding. Therefore, it may be desirable to produce gating signals from each "nand" circuit to four of the SCRs rather than two of them in order to produce such a bi-directional path, for example, in FIG. 1 "nand" circuit 57 would trigger SCRs 6 and 9 as well as 5 and 10; "nand circuit 59 would trigger 4 and 11 as well as 3 and 12, and so on. Four opto-couplers rather than two as in the circuit of FIG. 3 would be employed. Providing such dynamic motor speed control could be useful because a wave-form such as shown in FIG. 6 is capable of synchronizing with a motor speed greater than (a multiple of) one-fourth of rated speed if the load conditions were such as to permit the motor to obtain that speed. Dynamic speed control would reduce or elimtnate the possibility that a motor under abnormally low load would synchronize to higher speed than the one-fourth speed desired.

Figure 7:
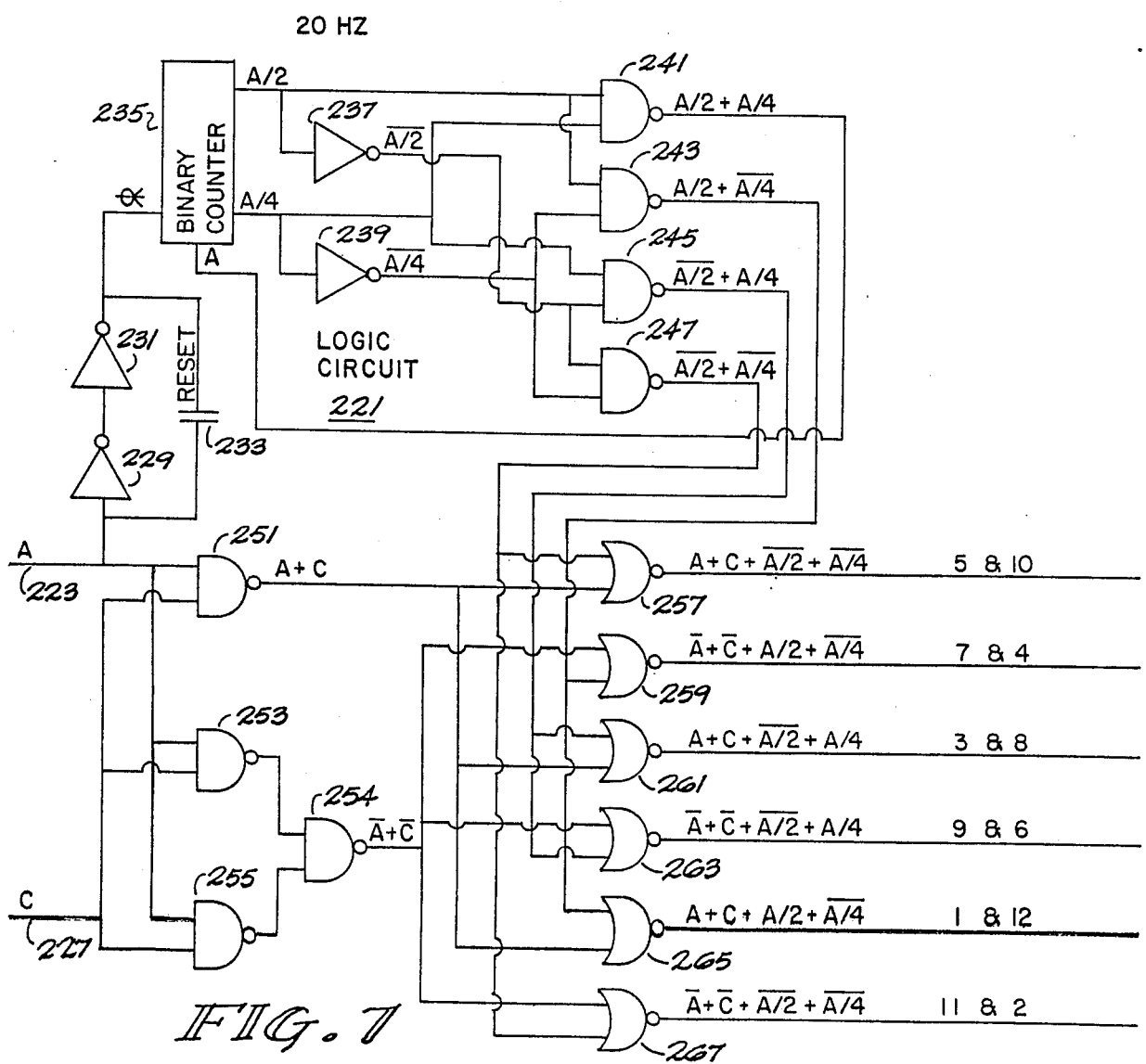
FIG. 7 is a schematic diagram of an alternative circuit similar to the circuit of FIG. 1, but arranged to provide gating signals for a 3-to-1 frequency reduction.

FIG. 7 shows a logic circuit to produce an output from the adapter at one-third the power supply frequency, or 20 Hz. Where appropriate the reference numbers for FIG. 7 applied to similar or corresponding elements are the same in the last two digits, but are from 200–299 with 2 as the first digit. The 20 Hz circuit of FIG. 7 requires only the phase A input 23 and the phase C input 27 from the delta-to-Y converter of FIG. 2. This situation arises because the factor of division for the frequency is 3 which is equal to the number of phases, also 3. "Nand" circuits 251, 253, 254, and 255 are connected to produce only two outputs, namely A "and" C together with not A "and" not C.

Inverting amplifiers 229 and 231 together with capacitor 233 perform the same function as corresponding elements in FIG. 1. Binary counter 235 corresponds to binary counter 35 in FIG. 1 except that it has an input A to reset the counter transmitted from the output of "nand" circuit 241. This causes the counter to be a divide by three counter rather than a divide by four counter as in FIG. 1. The remaining connections of inverters 237, 239 and "nand" circuits 243, 245, and 247 correspond to FIG. 1 and function in a similar manner.

Three outputs are supplied from the counter circuit to "nor", circuits 257, 259, 261, 263, 265, and 267 corresponding to 57, 59, 61, 63, 65, and 67 shown and described in FIG. 1. Wave-form B of FIG. 8 does not enter into the operation of the circuit of FIG. 7. Also, wave-form 272 in FIG. 8 and wave form 271 of FIG. 8 are cut short and reset at the end of three periods of the input power.

Wave-forms 276 through 281 show how every third half-wave of a particular phase corresponds to an output desired from the adapter for one phase of the load. This may be better seen in FIG. 9 where phase III–II receives wave-form 282 in which positive half-wave 283 is triggered by wave-form 276 of FIG. 8 and negative half-wave 285 is triggered by wave-form 279 of FIG. 8, and so on.

FIG. 10 shows an alternate circuit for obtaining an output from the adapter at 30 Hz, one-half of the power supply frequency. Inputs from the delta-to-Y converter for phases A, B, and C are conductors 323, 325, and 327. "Nand" Circuits 351, 353, and 355 correspond to FIG. 1. The pulse shaping circuit consisting of inverters 333, 329 and capacitor 331 perform the function previously explained, but binary counter 335 has only one output, A/2, as shown. A second output of "not" A/2 is provided by inverter 337 and these two outputs are sent to "nor" circuits 357, 359, 361, 363, 365, and 367 in combination with the outputs from "nand" circuits 351, 353, and 355.

By reference to FIG. 11 and FIG. 12 it will be seen that the appropriate wave-form 382 for the III–II phase of the output is produced as positive half-wave 383 is triggered by wave-form 376, negative half-wave 385 is triggered by wave-form 377, etc.

The logic circuit elements described heretofore are standard off-the-shelf items and the adapter of the invention can be made in a straightforward manner by utilizing printed circuit board technology and available multiple "nand" or "nor" integrated circuit components. Of course, the circuit can also be made in a less sophisticated or a more sophisticated manner with circuits employing discrete transistor elements wired together to form "nand" and "nor" circuits, or with a custom integrated circuit chip where the entire logic circuit could be fabricated on a chip according to well known technology.

It will be apparent to those knowledgeable in the art that a combination circuit could be made which could provide either two times, three times, or four times frequency division in the power output under either manual or electronic selection. The ability to provide either a reduced frequency or straight feed-through of the power with no frequency reduction could also be implemented with electronic control.

Also it will readily be seen that the system could be logically extended to divide by an integer greater than four, this would require a divide by eight counter and appropriate connections of the logic element to divide by a larger integer. Of course, for a given application there would be a practical limit to the amount of frequency reduction where the interval between half-wave pulses became too great for proper operation of a motor.

There is no apparent limit to the size of the motor that could be controlled with an adapter of the present invention. Of course, SCRs 1 through 18 must have an appropriate rating for the current and voltage which they are switching. All other elements of the circuit are controlling only low control voltages and currents and thus the power being switched is relatively insignificant for selection of all other electronic elements than the SCRs 1 through 18. Any requirement for large gating currents or voltages for the SCRs or other thyristor switching elements could be accomodated by providing amplifiers for the trigger signals to the thyristors.

In some aplications it may be important to suppress harmonics which inherently exist in the non-sinusoidal output of the power line adapter of the invention. Conventional power line harmonic suppression filters employing large capacitors, or the like, could be added to the adapter in those rare instances in which a harmonic output was unacceptable.

In addition to thse variations and modifications of the invention shown and suggested above, other variations and modifications will be apparent to those skilled in the art and accordingly, the scope of the invention is not to be considered to be limited to those embodiments, variations, and modifications shown or suggested, but is rather to be determined by reference to the appended claims.

What is claimed is:

1. A polyphase power line adapter for providing polyphase electric power to operate a polyphase motor at a speed less than rated speed by an integer factor, herein designated N, comprising
    (1) at least three input terminals adapted to connect to respective conductors of said polyphase power line,
    (2) means connected to said input terminals for producing a plurality of cyclic pulse control signals each such signal being synchronized with a wave-form of a respective phase of said polyphase power line,
    (3) at least three output terminals for connection to said motor,
    (4) a bridge of at least six electronically gated switches connecting respective ones of said input terminal to at least two of said output terminals,
    (5) a divider circuit having an input connected to receive one output from said means of (2), the effective division factor of the divider circuit output being equal to N, and
    (6) a plurality of logical "and" circuits each having an output connected to a gate of one of said switches and a plurality of inputs with at least one input connected from said means of (2) and at least one input connected from said divider, the inputs of said "and" circuits being connected to divider circuit in a fashion such that only each Nth half-wave of one phase from said power line is transmitted to each respective pair of said output terminals, whereby polyphase half-wave voltage pulses with a repetition rate 1/N times the rate of said power line half-wave rate are transmitted to respective pairs of said output terminals.

2. Apparatus as recited in claim 1 wherein said means connected to said input terminals comprises a delta-to-Y converter circuit.

3. Apparatus as recited in claim 2 wherein said means connected to said input terminals comprises pulse shaper circuits connected to receive the output of said converter circuit.

4. Apparatus as recited in claim 1 wherein said means connected to said input terminals includes a plurality of "and" circuits each receiving at least two inputs of pulses synchronized with different phases of said power line to produce output pulses from said logical "and" circuits with a pulse length less than one-half the period of the wave-form of said power line.

5. Apparatus as recited in claim 1 wherein said divider circuit includes a plurality of "and" circuits with outputs individually and sequentially activated during the course of one period of the power line input wave-form.

6. Apparatus as recited in claim 1 further including respective optical coupler and buffer circuits for coupling the outputs of said logical "and" circuits each to two or more of said switches.

7. A polyphase power line adapter for providing reduced current and frequency power to operate a polyphase motor at a speed less than rated speed by an integer factor, herein designated N, comprising
 (1) at least three input terminals adapted to connect to respective conductors of said polyphase power line,
 (2) means connected to said input terminals for producing a plurality of cyclic pulse control signals each such signal being synchronized with a wave-form of a respective phase of said polyphase power line,
 (3) at least three output terminals for connection to said motor,
 (4) a thyristor bridge of at least nine thyristors cross-connecting respective ones of said input terminals to at least two of said output terminals,
 (5) a binary divider counter circuit having an input connected to receive one output from said means of (2), the effective division factor of the counter circuit output being equal to N, and
 (6) a plurality of logical "and" circuits each having an output connected to a gate of one of said thyristors and a plurality of inputs with at least one input connected from said means of (2) and at least one input connected from said counter, the inputs of said "and" circuits being connected to said counter circuit in a fashion such that only each Nth half-wave of one phase from said power line is transmitted to each respective pair of said output terminals.

8. Apparatus as recited in claim 7 wherein said means connected to said input terminals comprises a delta-to-Y converter circuit.

9. Apparatus as recited in claim 8 wherein said means connected to said input terminals comprises pulse shaper circuits connected to receive the output of said converter circuit.

10. Apparatus as recited in claim 7 wherein said means connected to said input terminals includes a plurality of "and" circuits each receiving at least two inputs of pulses synchronized with different phases of said power line to produce output pulses from said logical "and" circuits with a pulse length less than one-fourth the period of the wave-form of said power line.

11. Apparatus as recited in claim 7 wherein said divider counter circuit includes a plurality of "and" circuits with outputs individually and sequentially activated during the course of one period of the power line input wave-form.

12. Apparatus as recited in claim 7 further including respective optical coupler and buffer circuits for coupling the outputs of said logical "and" circuits each to two or more of said thyristors.

13. A 3-phase power line adapter for providing reduced current and reduced frequency power to operate a 3-phase motor at a speed less than rated speed by an integer factor greater than one and less than ten, herein designated N, comprising
 (1) three input terminals adapted to connect to respective conductors of said 3-phase power line,
 (2) means connected to said input terminals for producing three cyclic square-wave signals each such signal being synchronized with a wave-form of a respective phase of said power line and having a pulse length of one-half the period of said wave-form,
 (3) at least three output terminals for connection to said motor,
 (4) a thyristor bridge of at least nine thyristors cross-connecting each of said input terminals to at least two of said output terminals,
 (5) a binary divider counter circuit having an input connected to receive one output from said means of (2), the effective division factor of the counter circuit output being equal to N, and
 (6) a plurality of logical "and" circuits each having an output connected to a gate of one of said thyristors and a plurality of inputs with at least one input connected from said means of (2) and at least one input connected from said counter, the inputs of said "and" circuits being connected to said counter circuit in a fashion such that gating pulses having a length of about one-sixth the period of said wave-form are produced at the outputs of said "and" circuits,
 whereby only each Nth half-wave of one phase from said power line is transmitted to each respective pair of said output terminals.

14. Apparatus as recited in claim 13 wherein said means connected to said input terminals comprises a delta-to-Y converter circuit.

15. Apparatus as recited in claim 14 wherein said means connected to said input terminals comprises pulse shaper circuits connected to receive the output of said converter circuit.

16. Apparatus as recited in claim 13 wherein said means connected to said input terminals includes a plurality of "and" circuits each receiving at least two inputs of said square-wave signals producing output pulses with a pulse length about one-sixth the period of the wave-form of said power line.

17. Apparatus as recited in claim 13 wherein said divider counter circuit includes a plurality of "and" circuits with outputs individually and sequentially activated during the course of one period of the power line input wave-form.

18. Apparatus as recited in claim 17 further including respective optical coupler and buffer circuits for coupling the outputs of said logical "and" circuits each to two or more of said thyristors.

19. Apparatus as recited in claim 13 further including respective optical coupler and buffer circuits for coupling the outputs of said logical "and" circuits each to two or more of said thyristors.

20. Apparatus as recited in claim 13 wherein N is equal to 4.

* * * * *